(12) United States Patent
Billman et al.

(10) Patent No.: US 12,167,726 B1
(45) Date of Patent: Dec. 17, 2024

(54) TERMITE DETECTION AND MITIGATION SYSTEM

(71) Applicant: UIPCO, LLC, San Antonio, TX (US)

(72) Inventors: Bradly Jay Billman, Celina, TX (US); Brian Tougas, Spring Branch, TX (US); Arthur Quentin Smith, Fredericksburg, TX (US); Mark Paxman Warnick, San Antonio, TX (US); Oscar Roberto Tijerina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 222 days.

(21) Appl. No.: 17/887,369

(22) Filed: Aug. 12, 2022

Related U.S. Application Data

(60) Provisional application No. 63/233,140, filed on Aug. 13, 2021.

(51) Int. Cl.
*A01M 1/02* (2006.01)
*A01M 1/20* (2006.01)
*G06N 3/08* (2023.01)
*G08B 21/18* (2006.01)

(52) U.S. Cl.
CPC .......... *A01M 1/026* (2013.01); *A01M 1/2011* (2013.01); *G06N 3/08* (2013.01); *G08B 21/182* (2013.01)

(58) Field of Classification Search
CPC ....... A01M 1/026; A01M 1/2011; G06N 3/08; G08B 21/182
See application file for complete search history.

(56) References Cited

U.S. PATENT DOCUMENTS

| | | | |
|---|---|---|---|
| 2015/0208636 A1* | 7/2015 | David | A01M 13/00 340/573.2 |
| 2017/0132512 A1* | 5/2017 | Ioffe | G06N 3/04 |
| 2018/0132469 A1* | 5/2018 | Frudakis | A01M 1/026 |
| 2018/0299842 A1* | 10/2018 | Reid | A01M 1/026 |
| 2021/0000097 A1* | 1/2021 | Marchesini | B64D 1/18 |
| 2021/0279639 A1* | 9/2021 | Singh | G06V 20/182 |
| 2022/0279773 A1* | 9/2022 | Lin | G08B 21/24 |

* cited by examiner

*Primary Examiner* — Ryan W Sherwin
(74) *Attorney, Agent, or Firm* — Perkins Coie LLP

(57) ABSTRACT

A termite detection and mitigation system can gather data describing conditions at a location, including the location's elevation, soil type, topography, weather conditions, and season. The termite detection and mitigation system can additionally obtain sensor data describing environmental conditions within a structure (e.g., a home or other building) at the location. Sensor data may be obtained using a termite sensing device placed within the structure. The termite detection and mitigation system can develop models that characterize how likely it is that termites are present within a structure based on its sensor data and associated location data. Using the models, the termite detection and mitigation system can alert users when there is a likelihood that termites are present. The termite detection and mitigation system can also deploy mitigation responses, such as poisons or sealants, to mitigate the termite intrusion.

18 Claims, 7 Drawing Sheets

TERMITE DETECTION AND MITIGATION SYSTEM

CROSS-REFERENCE TO RELATED APPLICATION

This application claims the benefit of U.S. Provisional Patent Application No. 63/233,140 filed Aug. 13, 2021, which is incorporated herein by reference in its entirety.

TECHNICAL FIELD

The present disclosure is directed generally to detecting the presence of termites and mitigating the intrusion of termites.

BACKGROUND

Termites are a class of insects that generally feed on dead plant materials and cellulose and particularly feed on wood. Because they feed on wood, termites can do significant damage to wooden structures. For example, termites can damage the wood frame, wood flooring, and other wooden elements of homes and other buildings.

Furthermore, many of these susceptible wooden elements can be difficult to observe if, for example, they are behind drywall, in a crawl space, or in other unfinished space. As a result, the presence of termites often remains undetected until the termites have caused a significant amount of damage.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
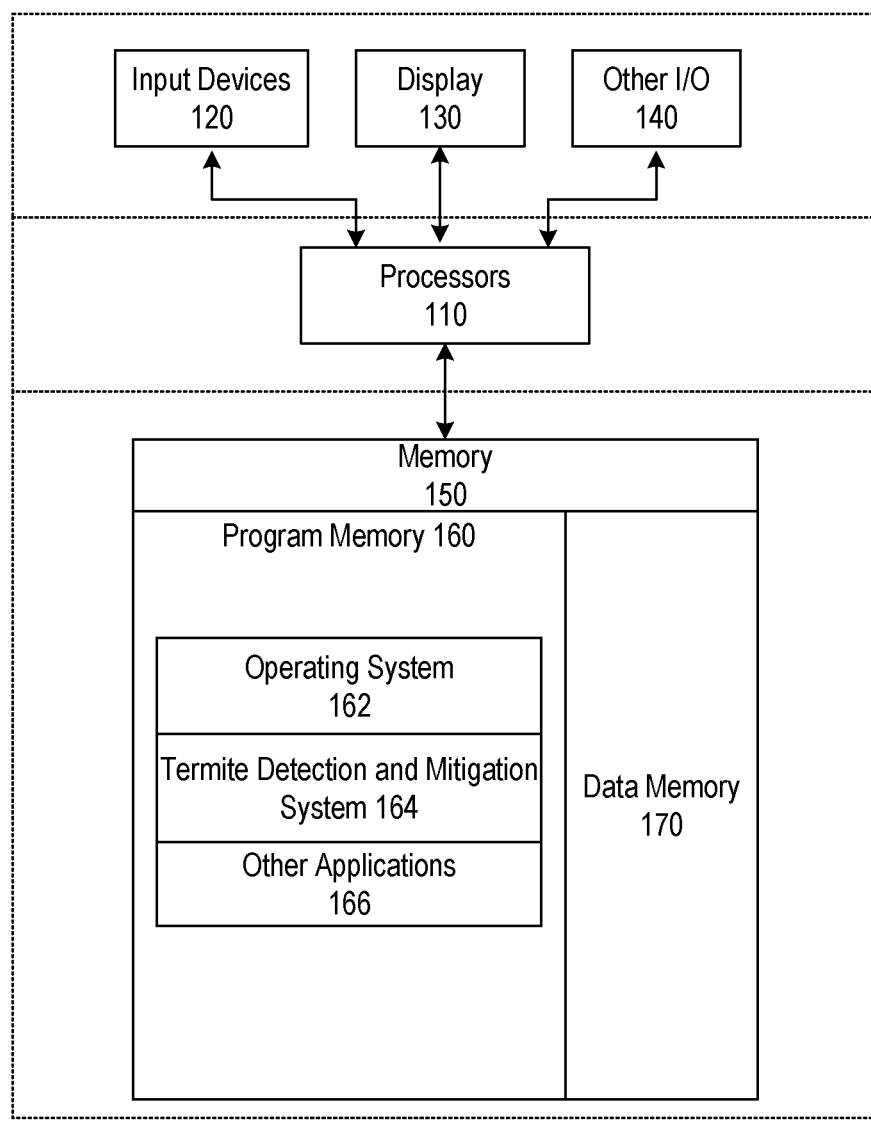
FIG. 1 is a block diagram illustrating an overview of devices on which some implementations of a termite detection and mitigation system can operate.

A termite detection and mitigation system and associated methods are disclosed herein. The system utilizes data describing different aspects of a geographic location and its surroundings (herein "location-related data") and/or sensor data associated with a physical structure at the geographic location (e.g., a building) to assess the likelihood that termites are present in the structure or at the location. For example, the location-related data can include the ZIP code, elevation, topography, soil type, current weather, seasonal conditions, and/or other descriptive information associated with a location. The sensor data can include motion, vibration, heat, noise, chemicals, moisture, and/or other monitored environmental conditions observed within a structure at the location. Based on the location-related data and the sensor data, the system determines whether termites are likely present within the structure. The system can additionally, based on the determination that termites are likely present within the structure, deploy one or more termite mitigation steps at the structure. For example, as described herein, the system can deploy poison (to eliminate the termites) and/or sealant (to prevent further termite infestation of the structure) at the structure where termites were detected, determined egress/ingress points, etc. The system can additionally generate an alert to notify users associated with the structure of the detected termites and/or the mitigation steps taken. For example, the system can alert the owner of a home, an insurer, a government entity, a pest services firm, the manager of a commercial property, or neighbors of a building where termites were detected. The alerts, which can notify the user via a message displayed on a mobile application, an SMS message, an email, or some other communication channel, can inform the user that termites have been detected within a structure (e.g., at the user's home) as well as what mitigation steps were taken (e.g., poison was released).

In some embodiments, the termite detection and mitigation system includes one or more termite sensing devices used to facilitate the detection and mitigation of termites at a structure. As described herein, multiple termite sensing devices can be placed at various areas of a structure corresponding to the areas to be monitored. In the case of a home, for example, a first termite sensing device could be placed in the home's attic, a second and a third termite sensing device could be placed in the home's crawl space, and a fourth termite sensing device could be placed in the home's basement. Each termite sensing device can include one or more components to detect the presence of termites and/or to deploy mitigation responses. For example, a termite sensing device can include one or more sensors to observe characteristics of the environment surrounding the termite sensing device, such as motion, infrared, heat, noise, chemicals, and moisture. As a further example, a termite sensing device can include mitigation components, including poison that can be released to eliminate termites and/or a chemical sealant that can be released to seal voids or opened spaces. Portions of the sensors and/or mitigation components can be spaced apart from but connected to the body of the termite sensing device (e.g., in the form of a probe tethered to the termite sensing device body) such that, for example, readings can be taken from or gas (powder, or liquid) can be released to harder-to-reach places near the termite sensing device body. The termite sensing device can also include a wireless network interface to communicate with other aspects of the termite detection and mitigation system.

Using sensor data (e.g., obtained from termite sensing devices) and/or location-related data associated with a structure (e.g., a house, a commercial property, etc.), the termite detection and mitigation system can determine the likelihood that termites are present at the structure. The system can detect the presence of termites from the sensor data and/or location-related data using models and/or heuristics.

That is, as described below, the system may determine that certain observed environmental characteristics and/or data related to a structure indicate a likelihood of a termite infestation. For example, certain observed heat or moisture levels (obtained from sensors) combined with weather conditions and/or patterns of termite intrusion history may indicate a likelihood of a new termite infestation. As a further example, the system can evaluate the sensor data obtained over time for a structure to determine whether there is an anomalous change indicating the presence of termites. Advantageously, the termite detection and mitigation system can identify historical trends showing correlations between the environmental characteristics and/or data related to a structure and its location and the corresponding likelihood of termites being found within the structure, based on data for many different locations and structures that experience similar weather patterns, elevations, etc. The termite detection and mitigation system can evaluate whether there is a likely termite infestation periodically (e.g., hourly or daily), in response to changes in the sensor data obtained from termite sensing devices, in response to obtaining new location-related data associated with a location, and/or in response to a user request.

In some embodiments, the termite detection and mitigation system deploys mitigation responses based on the detection of termites. For example, the system can deploy responses that include poison to eliminate termites and/or a chemical sealant to seal voids or opened spaces. In some embodiments, the system determines which, if any, mitigation steps to take based on historical detection and mitigation data associated with a structure. For example, if at a structure the system released poison recently (e.g., within the last 12 hours, within the last day, and/or within the last week) and/or exceeding a threshold (e.g., over a certain number of times in the past week), the system may deploy a mitigation response other than poison. In some embodiments, the system determines which mitigation steps to take based on which are most likely to be effective. As a further example, if at a structure, the system determines (based on historical trends) that poison has had little impact on termites at the structure, the system may deploy an alternative mitigation response (e.g., a sealant).

In some embodiments, the termite detection and mitigation system alerts users based on the detection of termites and/or deployment of mitigation responses. For example, the system can alert a user that termites were detected at an associated structure (e.g., the user's home) and what mitigation responses were deployed. The alert can additionally provide information based on historical data associated with the structure, such as whether the frequency of termite detection has increased or decreased or whether deployed mitigation responses have been effective. In some embodiments in which multiple termite sensing devices are placed in different areas of a structure, the alert can indicate a status for each of the different areas (e.g., to alert a user that termites were detected and poison was deployed in a crawl space but that an attic appears to be free of termites). The alert can additionally include status information for any termite sensing devices, including the remaining level of poison or sealant, the remaining battery level, etc. In some embodiments, the alert can include community-based information, such as whether termites have been detected in any nearby structure.

The termite detection and mitigation system can maintain data associated with locations and structures. For example, the system can maintain historical data of past instances of detecting termites at a structure and/or deploying mitigation responses (herein "termite detection and mitigation history.") Based on the maintained data, the system can determine whether the frequency of termite intrusions at a structure has changed, how effective mitigation responses have been, etc., which can be reported in system alerts. As a further example, the system can use the maintained data to determine whether or not there is a likelihood of a termite intrusion if, for example, an anomalous change is detected.

In some embodiments, the termite detection and mitigation system can utilize computer modeling techniques to transform large data sets (e.g., location-related data and/or sensor data) into predictions regarding the presence of termites (e.g., a termite detection score). In some embodiments, the termite detection score can additionally characterize how effective different mitigation responses are likely to be. For example, a termite detection score can, in addition to indicating a high likelihood that termites are detected at a structure, indicate that a poison is likely to be moderately effective and a sealant likely to be minimally effective. A "model," as used herein, refers to a construct that is trained using training data to make predictions or provide scores for new data items, whether or not the new data items were included in the training data. For example, training data for supervised learning can include items with various parameters and an assigned classification or score. A new data item can have parameters that a model can use to assign a classification or score to the new data item. As another example, a model can be a probability distribution resulting from the analysis of training data, such as a likelihood of termites being found in a geographic location or within a structure. Examples of models include various types of neural networks, support vector machines, Parzen windows, Bayesian networks, clustering, reinforcement learning, probability distributions, decision trees, decision tree forests, and others.

In some embodiments, the model can be determined by applying statistical analyses to a data set (e.g., location-related data and/or sensor data) to isolate the effect of a particular indicator of a potential termite intrusion. An example of such a process applies regression to determine the termite detection score given a set of location-related data and/or sensor data. In other implementations, a machine learning model can be trained with supervised learning, where the training data includes location-related data and/or sensor data as inputs and a desired output, such as a human-labeled score specifying the likelihood that the corresponding location or structure has termites and/or the type of mitigation responses that may be effective. In training the model, a representation of a training item's location and observed environmental characteristics can be provided to the model (e.g., as a collection of words and/or as a set of factors specifying weather reports, the season of the year, reports of nearby termite infestations, how humid a location is and/or how humid it is within a structure, etc.). Output from the model (e.g., termite detection scores) can be compared to the desired output for that structure (the score label(s) assigned to that structure) and, based on the comparison, the model can be modified, such as in neural networks by changing weights between nodes of a neural network or parameters of the functions used at each node in the neural network (e.g., applying a loss function). After applying each of the location and observed environmental characteristics in the training data and modifying the model in this manner, the model can be trained to evaluate new locations and structures, as well as locations and structures with different characteristics. In some implementations, the training of a model can be updated at a later point using additional training data determined for a particular location or structure. For example, a model may initially be trained using training items that reflect national termite detection instances but as the system is deployed in particular regions, additional detections of termites in those regions may be more precise indicators for that deployment. Thus the training data for the model can be updated and the model retrained with these additional, location-specific training items. In some implementations, such individualized training items can be given higher weight in the training of the statistical or machine learning model than the more general training data items, such as by including multiple instances of these data items in the training data or by adding a multiplier to the amounts computed by the loss function to accord these items higher importance in the training process.

In some embodiments, the termite detection and mitigation system can utilize heuristics to transform large data sets (e.g., location-related data and/or sensor data) into termite detection scores. For example, a human operator can configure the system to evaluate data a certain way and/or to generate specified termite detection scores.

Although the termite detection and mitigation system described herein is in the context of detecting and responding to termite intrusions, it will be appreciated that the system can be used for other forms of infestation. For example, the system could be used to detect rats, ants, mold, and other nuisances by training a model to detect those nuisances instead of or in addition to termites. Similarly, the system can deploy different mitigation responses that are effective against different nuisances (e.g., a termite sensing device may have one type of poison to deploy against termites and another type of poison to deploy against ants).

There are many conditions that can be predictive of the arrival, or reflect an ongoing intrusion, of termites. Further, the conditions that are indicative of a termite intrusion change over time (e.g., in different seasons, soil types, climates, construction materials) and are different from one location and structure to the next. Understandably, it can be impossible for an individual to recognize when such a situation has occurred in their home, let alone monitor susceptible yet difficult-to-reach areas on an ongoing basis. The termite detection and mitigation system addresses this challenge by obtaining and evaluating volumes of data that describe the conditions in various locations and structures at those locations. Furthermore, the termite detection and mitigation system is able to train and retrain models from data describing locations and structures, environmental conditions present therein, and indications that termites are present, and can apply such models as circumstances change at various locations, thereby transforming retrieved and observed data into discrete termite detection scores. Such statistical or machine learning modeling from large datasets, and its application to obtained data describing conditions present in various locations and structures, thus both provides a specific improvement in computerized termite detection and serves as something other than an analog to human mental processes, which would not apply specific modeling techniques or determine transformations, in real-time, in the manner shown herein.

Several implementations are discussed below in more detail in reference to the figures. FIG. 1 is a block diagram illustrating an overview of devices on which some implementations of the disclosed technology can operate. The devices can comprise hardware components of a device 100 that evaluates data related to geographic locations and sensor data associated with the structures at those geographic locations to detect the possible presence of termites at those structures and alerts users and/or deploys mitigation responses accordingly. Device 100 can include one or more input devices 120 that provide input to processor or processors 110 (e.g., CPUs, GPUs, HPUs, etc.), notifying the processors 110 of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

The processors 110 can be a single processing unit or multiple processing units in a device or distributed across multiple devices. The processors 110 can be coupled to other hardware devices, for example, with the use of a bus, such as a PCI bus or an SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes an input device 120 as part of the display, such as when the input device is a touchscreen or is equipped with an eye direction monitoring system. In some implementations, the display is separate from the input device. Examples of display devices are an LCD display screen; an LED display screen; a projected, holographic, or augmented reality display (such as a heads-up display device or a head-mounted device); and so on. Other input/output (I/O) devices 140 can also be coupled to the processor, such as a network card, video card, audio card, USB, firewire or other external device, camera, printer, speaker, CD-ROM drive, DVD drive, disk drive, or Blu-ray device.

In some implementations, the device 100 also includes a communication device (not depicted) capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, a termite detection and mitigation system 164, and other application programs 166. Memory 150 can also include data memory 170, e.g., data characterizing geographic locations, including the ZIP code, elevation, topography, soil type, current weather, seasonal conditions, and/or other descriptive information associated with a location (e.g., location-related data); sensor data obtained from and/or associated with geographic locations or structures at those geographic locations, including data regarding motion, heat, noise, chemicals, moisture, and/or other monitored environmental conditions; computer models to determine the likelihood of the presence of termites (e.g., represented by termite detection scores) from location-related data and sensor data; configuration data; settings; and user options or preferences; etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
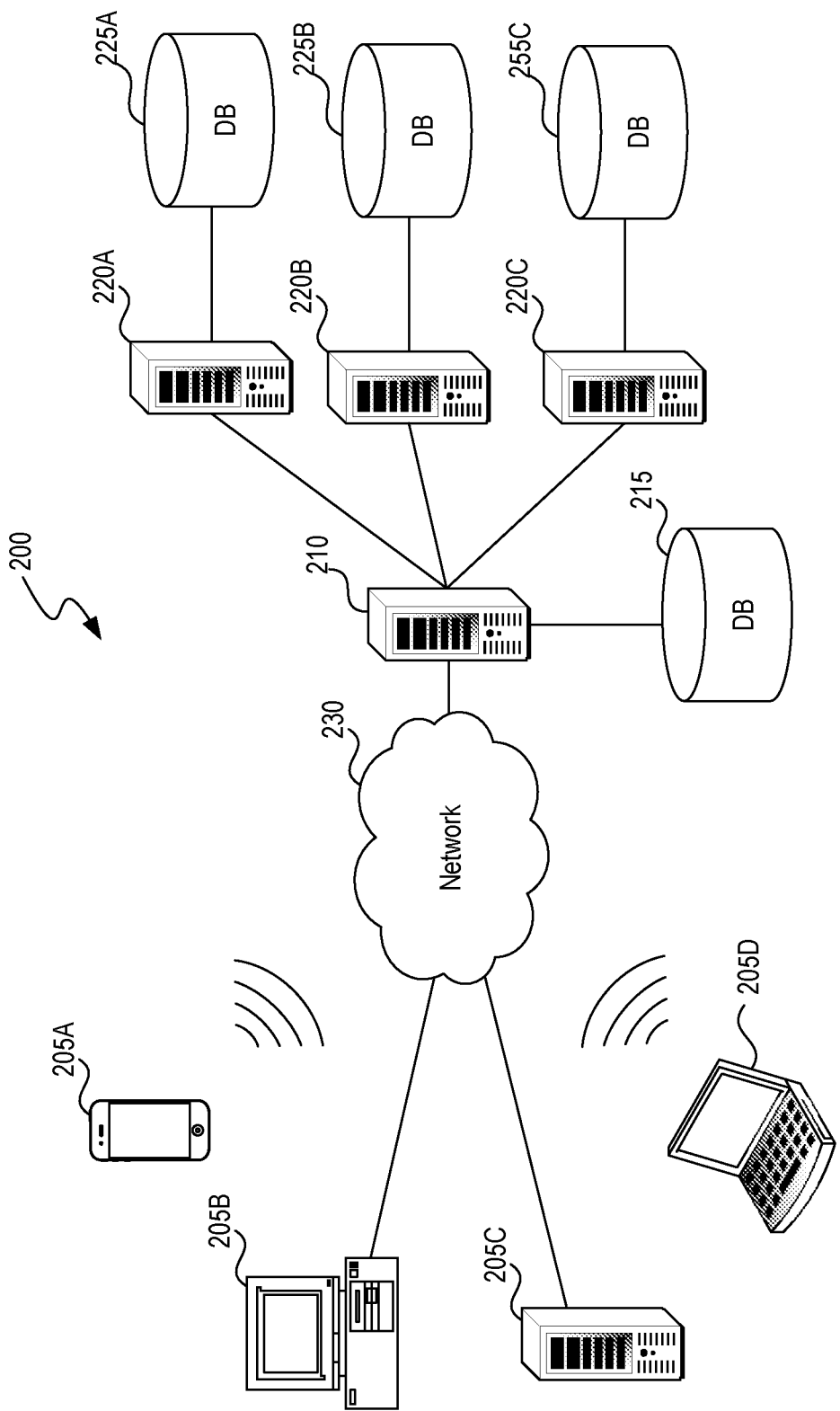
FIG. 2 is a block diagram illustrating an overview of an environment in which some implementations of a termite detection and mitigation system can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210 and server computing devices 220A-C.

In some implementations, server computing device 210 can be an edge server that receives client requests and coordinates fulfillment of those requests through other servers, such as server computing devices 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server computing device 220 corresponds to a group of servers.

Client computing devices 205 and server computing devices 210 and 220 can each act as a server or client to other server/client devices. Server computing device 210 can connect to a database 215. Server computing devices 220A-C can each connect to a corresponding database 225A-C. As discussed above, each server computing device 220 can correspond to a group of servers, and each of these servers can share a database or can have their own database. Databases 215 and 225 can warehouse (e.g., store) information such as training data, location-related data, sensor data, termite detection scores, and historical data characterizing past instances of termites detected and mitigation responses deployed at a structure. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but it can also be another type of wired or wireless network. Network 230 may be the Internet or some other public or private network. Client computing devices 205 can be connected to network 230 through a network interface, such as by wired or wireless communication. While the connections between server computing device 210 and server computing devices 220 are shown as separate connections, these connections can be any kind of local, wide area, wired or wireless network, including network 230 or a separate public or private network.

Figure 3:
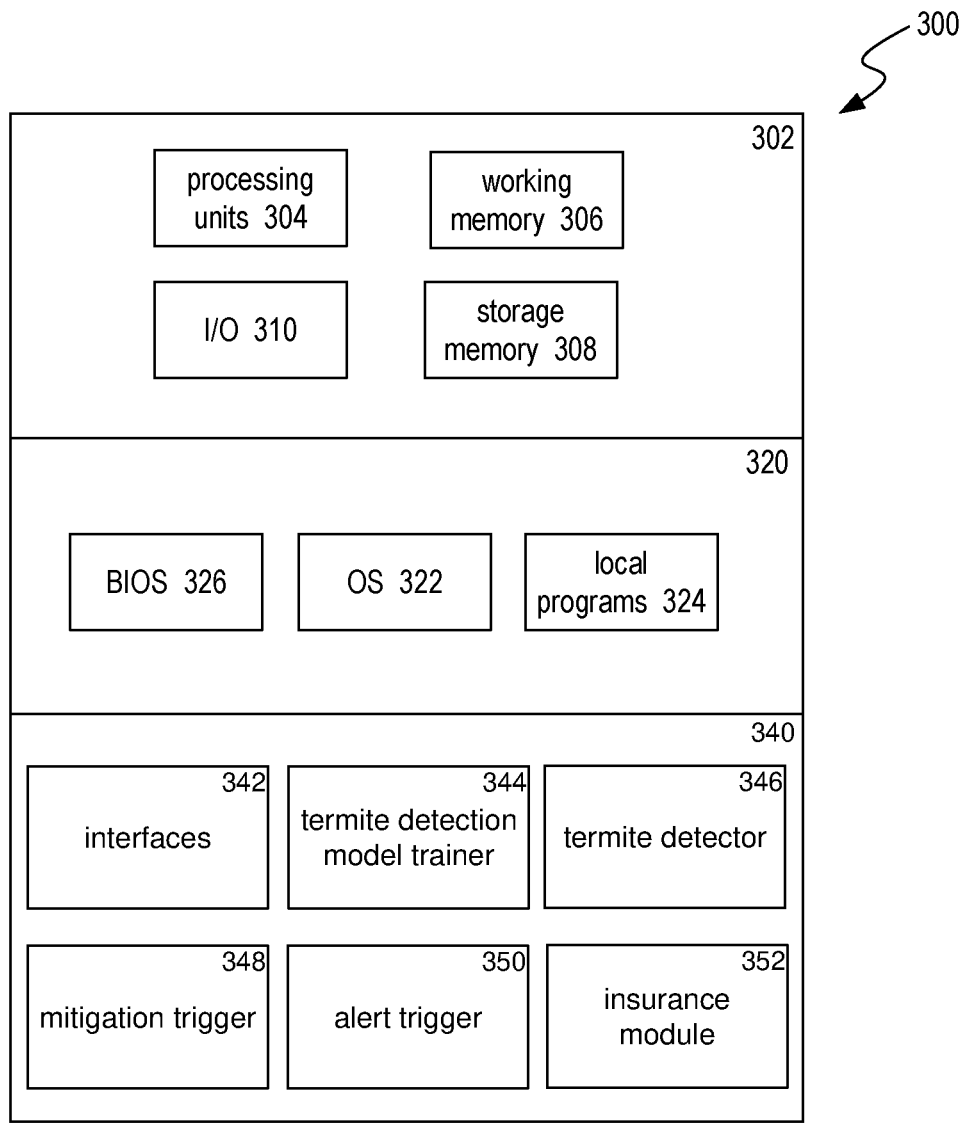
FIG. 3 is a block diagram illustrating components that, in some implementations, can be used in a system employing the disclosed technology.

FIG. 3 is a block diagram illustrating components 300, which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308 (local storage or an interface to remote storage, such as databases 215 or 225), and input/output devices 310. In various implementations, storage memory 308 can be one or more of the following: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as database 215 or storage provided through another server computing device 220). Components 300 can be implemented in a client computing device, such as client computing devices 205, or on a server computing device, such as server computing device 210 or 220.

General software 320 can include various applications including an operating system 322, local programs 324, and a basic input/output system (BIOS) 326. Specialized components 340 can be subcomponents of a general software application 320, such as local programs 324. Specialized components 340 can include termite detection model trainer 344, termite detector 346, mitigation trigger 348, alert trigger 350, and components that can be used for providing user interfaces, transferring data, and controlling the specialized components, such as interfaces 342. In some implementations, components 300 can be in a computing system that is distributed across multiple computing devices or can be an interface to a server-based application executing one or more of the specialized components 340. Although depicted as separate components, specialized components 340 may be logical or other nonphysical differentiations of functions and/or may be submodules or code-blocks of one or more applications.

Termite detection model trainer 344 trains a computer model for generating termite detection scores associated with geographic locations and structures based on information about the geographic locations and structures. Termite detection model trainer 344 can utilize training data (e.g., training location-related data characterizing a location, training sensor data characterizing environmental conditions of a structure at the location, and a corresponding termite detection score) to train a model that can predict termite detection scores for new data (e.g., new locations and new sensor data). The model and associated predictions can be refined by, for example, feedback from an operator of a termite detection and mitigation system and/or feedback from users of the termite detection and mitigation system. Examples of models include neural networks, support vector machines, Parzen windows, Bayesian networks, clustering, reinforcement learning, probability distributions, decision trees, decision tree forests, and others. Additional details on training a termite detection score model are provided below in reference to process 500 of FIG. 5.

Termite detector 346 determines whether termites are likely present within a structure. In some implementations of the disclosed technology, termite detector 346 generates termite detection scores, characterizing the likelihood that termites are present in a structure, based on information associated with the structure and its location (e.g., location-related data and/or sensor data). In some implementations, termite detector 346 generates the termite detection scores based on one or more models created using historical and/or training location-related data and sensor data (e.g., a model trained by termite detection model trainer 344). In some implementations, termite detector 346 generates the termite detection score using heuristics. Additional details on detecting termites at a location are provided below in reference to process 600 of FIG. 6.

Mitigation trigger 348 determines what (if any) mitigation response to deploy in response to detecting termites in a structure. In some implementations of the disclosed technology, mitigation trigger 348 determines which mitigation responses to deploy based on data characterizing previous termite detections and deployed mitigation responses in a structure. For example, mitigation trigger 348 could determine whether to deploy poison and how much to deploy based on how recently poison was deployed in a structure. In some implementations of the disclosed technology, mitigation trigger 348 determines which mitigation responses to deploy based on aspects of a termite detection score characterizing which mitigation responses are more likely or less likely to be effective.

Alert trigger 350 generates user alerts to inform users of a termite-related status at structures associated with the users. For example, upon detecting termites at a user's home (based, for example, on termite detection scores), alert trigger 350 can alert the user that termites were detected. The alerts generated by alert trigger 350 can additionally include mitigation response information, including what mitigation responses were deployed in response to the detected termites. In some embodiments, alert trigger 350 can generate alerts with information regarding multiple areas associated with a structure, including areas in which termites have not been detected. For example, alert trigger 350 can generate an alert notifying a user that termites have been detected in the basement of the user's home but that no termites have been detected in the home's crawl space.

Insurance module 352 detects when a termite detection and mitigation system is installed at user location or building and determines an insurance rate. The insurance module 352 can adjust the insurance rate of the user based on the installation of the termite detection and mitigation system or the mitigation steps that a user takes after termites are detected. For example, the insurance module 352 decreases an insurance rate of the user since the termite detection and mitigation system can detect termites early and prevent significant damage to a building. In another example, the insurance module 352 can increase the insurance rate of a user if termites are detected but the user waits a threshold of time before taking action to mitigate the termites. The insurance module 352 can determine an insurance rate for a user location based on data collected from other locations within a proximity (e.g., any distance such as feet, yards, or miles) of the user location. For example, the insurance module 352 can adjust insurance rates for the user location based on whether termites are detected at locations within a proximity of the user location.

Interfaces 342 generate user interfaces for the system. For example, interfaces 342 can generate interfaces through which an administrator or operator of the system can input training data and update computer models generated from the training data. As a further example, interfaces 342 can generate interfaces through which system users can input feedback regarding whether the presence of termites detected by the system was confirmed (e.g., upon visual inspection by the user or other). As a still further example, interfaces 342 can generate interfaces to display information regarding a structure, or multiple areas associated with a structure, including whether termites have been detected and what mitigation responses were deployed.

Figure 4:
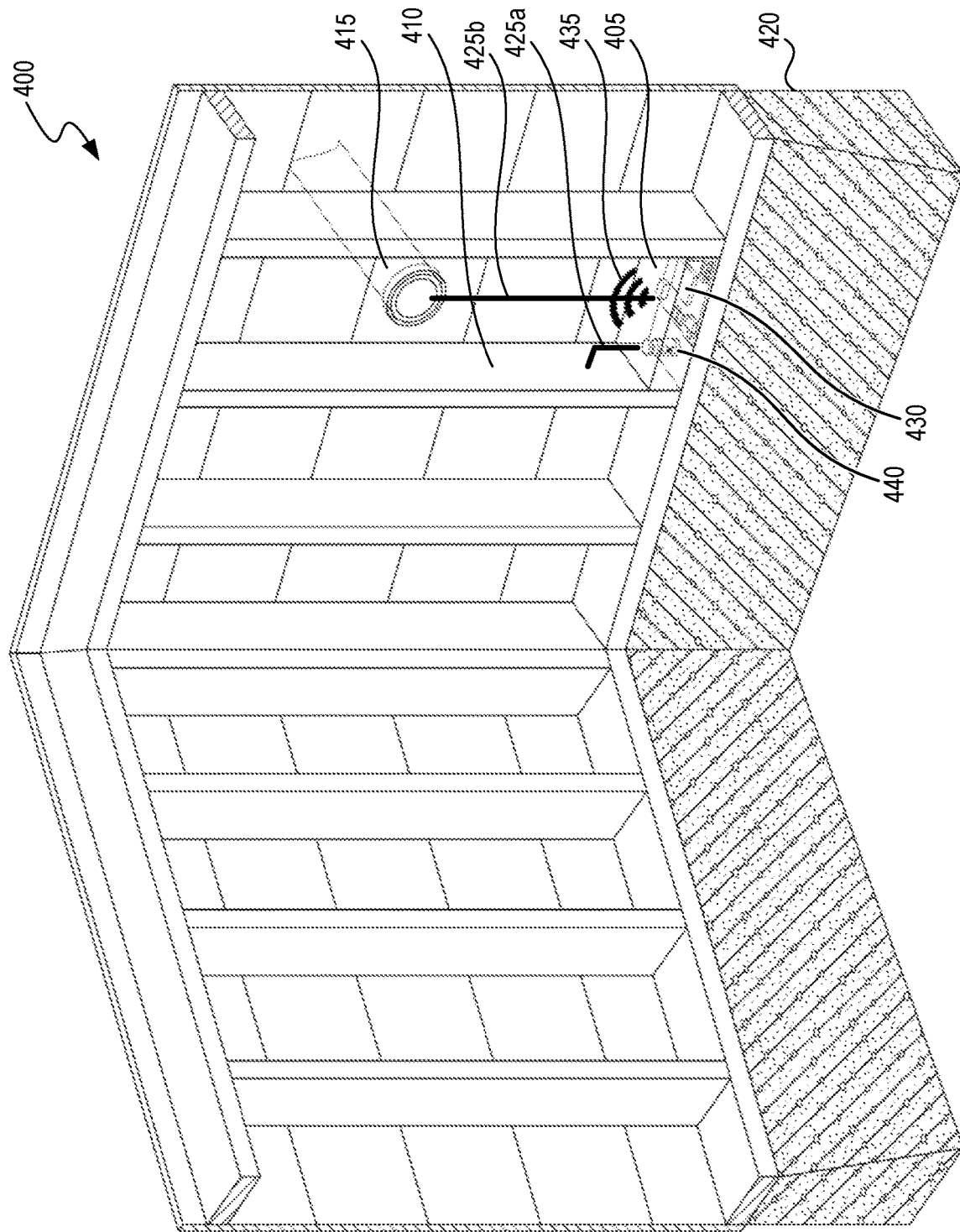
FIG. 4 is an isometric view illustrating aspects of a termite detection and mitigation system and an environment in which the system can operate.

FIG. 4 is an isometric view 400 illustrating aspects of a termite detection and mitigation system and an environment in which the system can operate. The termite detection and mitigation system can include a termite sensing device 405 used to monitor for and/or respond to termites in an area of a structure. For example, in the embodiment illustrated in FIG. 4, the termite sensing device 405 is placed in a basement area of a structure (e.g., a home, a commercial building, etc.), where it can be used to monitor a wood member 410, a pipe 415, and/or a foundation 420. It will be appreciated that the termite sensing device 405 can monitor other components or features of an area in which it is placed that could be susceptible to termite intrusion or damage, as well as be placed in other areas in which termites may be found (e.g., crawl spaces, attics, baseboards near openings through a concrete foundation for water pipes and sewer pipes, etc.). The termite sensing device 405 includes probes 425a and 425b to monitor areas remote from the termite sensing device 405. For example, in the embodiment illustrated in FIG. 4, probe 425a is used to monitor the wood member 410, and probe 425b is used to monitor the pipe 415. The probes 425a and 425b can include one or more sensors used to obtain environmental data in the areas being monitored. For example, the probes 425a and 425b can include sensors to detect and/or measure motion, heat, noise, chemicals, moisture, and/or other environmental conditions. The probes 425a and 425b can be coupled to computing system 430 to enable processing and/or evaluation of data obtained from the probes. For example, the computing system 430 can process analog signals from the probes 425a and 425b to generate digital values corresponding to sensor data, evaluate data to determine the likelihood that termites are present and/or whether to deploy a mitigation response, etc. The computing system 430 can include one or more processors, memories, and power sources (e.g., a battery in the termite sensing device 405 and/or a power supply unit coupled to a building electrical supply).

In some embodiments, the computing system 430 includes a wireless network interface to enable wireless communication 435 with one or more other computing devices (not shown). For example, in some embodiments of the disclosed technology, another computing device (e.g., a user's client device, a server, etc.) receives data from the termite sensing device 405 using the wireless communication 435 and evaluates the data to detect the presence of termites. As a further example, the other computing device can transmit instructions to the termite sensing device 405 using the wireless communication 435 indicating what mitigation responses to deploy.

In the embodiment illustrated in FIG. 4, the termite sensing device 405 includes poison 440, which can be deployed to mitigate termite infestations. The poison 440 can be coupled to the probes 425a and 425b, such that the poison can be deployed to the specific areas, or components within an area, where termites have been detected. The termite sensing device 405 can include additional aspects to deploy as a mitigation response, including sealants and/or lasers (not shown).

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
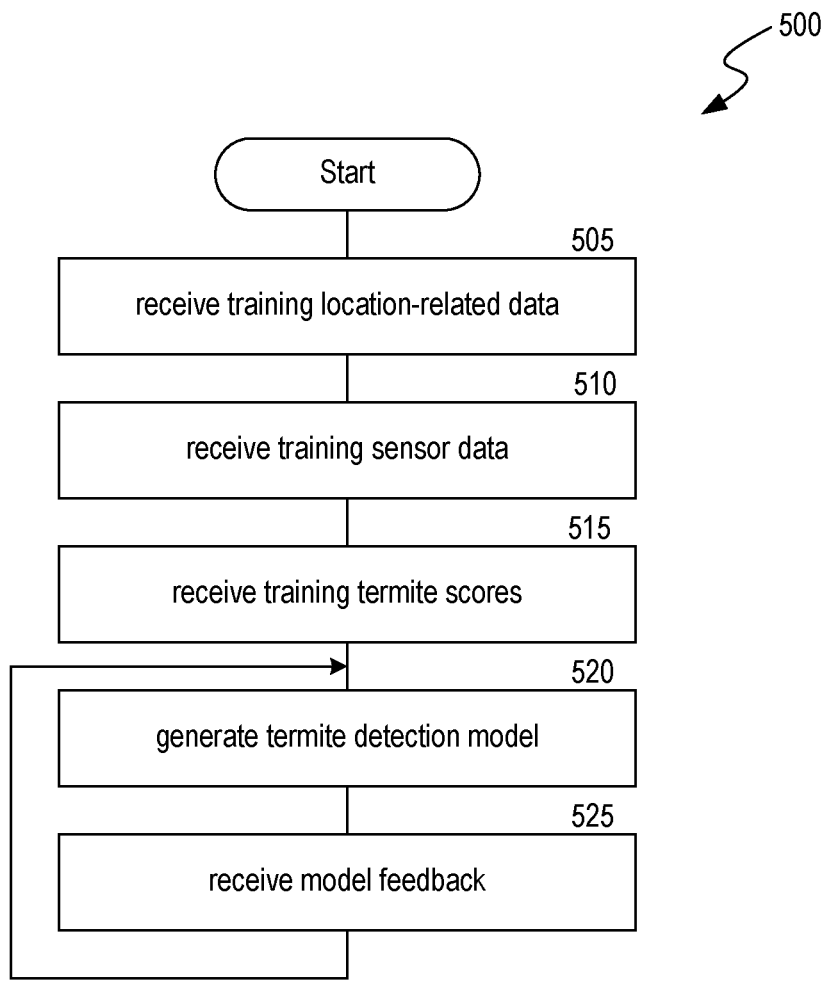
FIG. 5 is a flow diagram illustrating a process used in some implementations of a termite detection and mitigation system for generating a computer model to generate termite detection scores.

FIG. 5 is a flow diagram illustrating a process 500 used in some implementations of a termite detection and mitigation system for training a computer model to generate termite detection scores. In some implementations the process 500 can be performed periodically (e.g., hourly, daily, or weekly), when initiated by an operator or administrator of the system, and/or in response to an indication that there is new data available for training the model. In some implementations, process 500 can be performed at a user premises, such as on a mobile device or on device 405. In other implementations, data gathered by device 405 can be provided to a remote system, such as a server, to perform process 500.

The process 500 begins at block 505, where the process receives location-related data to be used for training. The location-related data describes various factors that can help determine whether termites might be found at a location. For example, the location-related data can include the ZIP code, elevation, soil type, topography, current weather, seasonal conditions, and/or other descriptive information associated with a location. The location-related data being used for training can, for example, be synthetic data generated for training purposes and/or historical data that has been previously evaluated by an operator of the system. The training location-related data can be natural-language text or structured data (e.g., XML, JSON, database query results, etc.).

At block 510, the process 500 receives sensor data to be used for training. The training sensor data characterizes various environmental conditions of a structure (e.g., a building such as a home) at a location, which may be indicative of a termite intrusion. The sensor data being used for training can, for example, be synthetic data generated for training purposes and/or historical data that has been previously evaluated by an operator of the system. The training sensor data can be natural-language text or structured data (e.g., XML, JSON, database query results, etc.).

At block 515, the process 500 receives termite detection scores to be used for training. As described herein, each termite detection score characterizes the likelihood that termites are found in a corresponding structure. For example, in some implementations, termite detection scores can range from 0 to 100, where 0 represents absolutely no chance that termites are present and 100 represents near certainty that termites are present. As a further example, in some implementations, termite detection scores can be selected from several descriptions, such as "high," "medium," and "low" likelihoods that termites are present. The termite detection scores can also reflect which of one or more potential mitigation responses are likely to be more effective or less effective against termites. For example, it may be that termites found in a certain region or climate are more sensitive to a first type of poison, whereas termites found in a different region or climate are more sensitive to a second type of poison. The termite detection scores used for training can, for example, by synthetic data generated for training purposes and/or generated from historical data that has previously been evaluated.

At block 520, the process 500 generates a computer model that generates termite detection scores from location-related data and sensor data, using the training data received at blocks 505, 510, and 515. For example, elements of the training termite detection scores received at block 515 may be associated with elements of the training location-related data received at block 505 and/or elements of the training sensor data received at block 510. The process 500 can evaluate the location-related data and the sensor data, and the corresponding termite detection scores used for training. Based on this evaluation, the process 500 can generate a model capable of generating termite detection scores from location-related data and sensor data not found in the training set. Examples of models include neural networks, support vector machines, Parzen windows, Bayesian networks, clustering, reinforcement learning, probability distributions, decision trees, decision tree forests, and others. In training the model, the process 500 can provide training location-related data and training sensor data to the model (e.g., as a collection of words and/or as a set of attributes conveying facts about the characteristics and/or environment at different geographic locations and structures at those geographic locations). The process 500 can compare the output from the model (estimated termite detection scores) to the desired output for that structure (e.g., based on the training termite detection scores). In a neural network, the process 500 can modify the model, such as by changing weights between nodes of the neural network or parameters of the functions used at each node in the neural network (e.g., applying a loss function). After applying each of the locations in the training data and modifying the model in this manner, the model is trained to evaluate new structures at different locations and/or new environmental conditions.

At block 525, the process 500 receives feedback for the termite detection score model. For example, the feedback could be from a system operator and/or from users and may indicate that a termite detection score generated by the model is too large or too small (e.g., underrepresented or overrepresented the likelihood that termites are present). The process then returns to block 520 to retrain the model based on the received feedback. For example, a model may initially be trained using training items that reflect national termite detection instances but as the system is deployed in particular regions, additional detections of termites in those regions may be more precise indicators for that deployment. Thus the training data for the model can be updated and the model retrained with these additional, location-specific training items. In some implementations, such individualized training items can be given higher weight in the training of the statistical or machine learning model than the more general training data items, such as by including multiple instances of these data items in the training data or by adding a multiplier to the amounts computed by the loss function to accord these items higher importance in the training process.

Figure 6:
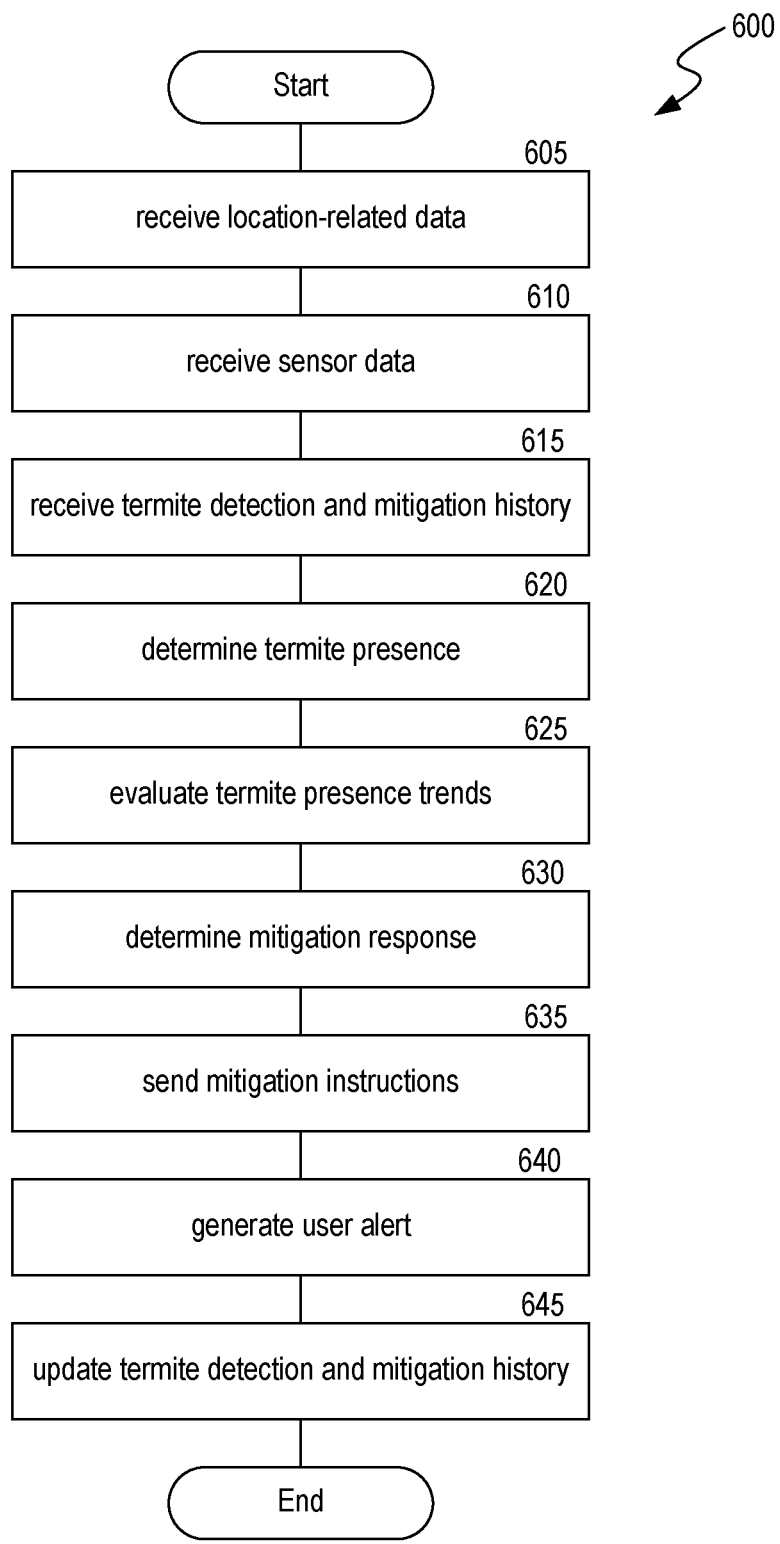
FIG. 6 is a flow diagram illustrating a process used in some implementations of a termite detection and mitigation system for detecting termites.

FIG. 6 is a flow diagram illustrating a process 600 used in some implementations of a termite detection and mitigation system for detecting termites within a structure. In some implementations, the process 600 can be performed periodically (e.g., hourly, daily, or weekly), when requested by a user associated with the structure (e.g., a homeowner), and/or in response to an indication that there is new data available (e.g., new location-related data for the location associated with the structure). In some implementations, process 600 can be performed at a user premises, such as on a mobile device or on device 405. In other implementations, data gathered by device 405 can be provided to a remote system, such as a server, to perform process 600.

The process 600 begins at block 605, where the process 600 receives data related to the location for which the presence of termites is to be evaluated. For example, when detecting whether termites are present at the home of a user, the received location-related data could include the ZIP code of the home as well as data describing the location of the home, such as the elevation, soil type, topography, current weather, and seasonal conditions at the home's location.

At block 610, the process 600 receives sensor data associated with the structure. Sensor data can characterize various environmental conditions within the structure, including motion, heat, moisture, sound, chemicals, and other conditions. The process 600 can receive multiple sets of sensor data associated with a structure, which for example can correspond to different areas of the structure. For example, the process 600 can receive sensor data for a crawl space as well for an attic at a home. As a further example, the process 600 can receive sensor data for a wood member within a basement as well as from a pipe connection in the basement. As described herein, sensor data can be obtained, for example, from one or more termite sensing devices deployed within the structure.

At block 615, the process 600 receives termite detection and mitigation history associated with the structure. The historical termite detection and mitigation data characterizes, for example, when termites have been detected previously in the structure, as well as which areas within the structure have previously had termites detected. The historical termite detection and mitigation data can additionally characterize what mitigation responses have been deployed previously, as well as details of the deployed mitigation responses (e.g., how much poison or sealant was deployed, what type of poison or sealant, etc.).

At block 620, the process 600 determines whether termites are likely present in the structure. In some embodiments, to determine whether termites are likely present, the process 600 generates termite detection scores for the structure based on the received location-related data and sensor data. The process 600 can generate the termite detection scores, for example, using a trained model, such as the termite detection model illustrated in FIG. 5, and/or using a heuristic that maps the location-related data and/or sensor data to a termite detection score. In some embodiments, the process 600 determines whether there are likely termites present based on a time-series analysis of the received sensor data. That is, for example, if the sensor data reflects unexpected deviations from typical or baseline sensor readings (when accounting for expected variations, such as due to change in seasons or current weather), the process may determine that termites are likely present.

At block 625, the process 600 evaluates the termite detection and mitigation history and/or the termite presence determination to identify any trends regarding the presence of termites in the structure. For example, the process 600 can determine whether termites are being detected more frequently or less frequently in the structure. As a further example, the process 600 can determine whether termites are being detected predominantly in certain areas of the structure (e.g., the attic) or during a certain season.

At block 630, the process 600 determines what mitigation response to deploy. As described herein, the process 600 can employ various different mitigation responses to combat a termite intrusion in a structure, including deploying poisons to eliminate termites and/or sealants to prevent further termite intrusions, using one or more termite sensing devices deployed within a structure. The process 600 can determine which mitigation response to deploy based on mitigation history associated with the structure (e.g., received at block 615), termite detection scores (e.g., generated at block 620), and/or termite presence trends (e.g., identified at block 625). For example, the process 600 can determine to deploy a poison in a structure based on a corresponding termite detection score that indicates that poison would be highly effective. As a further example, the process 600 can determine to deploy a sealant, despite indications that a poison would be highly effective, because the poison had been deployed in the structure recently and/or because trend data shows that past deployments of the poison have not been effective when used to combat termites within the structure.

At block 635, the process 600 sends mitigation instructions. The process 600 can transmit, to one or more termite sensing devices located within a structure, instructions to deploy mitigation responses available at those termite sensing devices. For example, the process 600 can instruct a first termite sensing device in a structure to deploy a poison and instruct a second termite sensing device in the structure to deploy a sealant.

At block 640, the process 600 generates termite-related alerts for the user. The alerts can include information such as where termites have been detected in a structure, when termites were last detected at different areas within the structure, and what mitigation responses were deployed. The alerts can additionally include information regarding any trends associated with the structure, such as whether there has been an increase or decrease in the frequency of detected termites. As a further example, the alerts can provide status information for any termite sensing devices associated with the structure, including the quantity of remaining poisons and/or sealants, the level of power remaining (e.g., in a battery), the signal strength of a wireless network interface, etc. As a still further example, the alerts can notify the user of termites detected at nearby structures in the same general location that have similar environmental or other conditions. The generated alerts can be provided to the user via one or more communication channels, such as through an application running on the user's mobile device, via an SMS text message, over email, via a phone call, etc.

At block 645, the process 600 updates (e.g., in a database or other data store) the termite detection and mitigation history associated with the structure. The process 600 then ends.

In some implementations, the detection and mitigation systems can be applied to detect other pests, bugs, or rodents, such as ants, ticks, bed bugs, beetles, spiders, bees, flies, scorpions, snails, mice, rats, snakes, etc. The detection and mitigation system can utilize sensors (e.g., cameras, infrared devices, moisture devices, thermometers, motion sensors, pressure sensors, optical sensors, etc.) to detect motion, vibration, moisture, damage, temperature, or any indications that a pest, bug, or rodent is active in an environment. In a first example, the detection and mitigation system monitors sensors in untreated lumber or unprocessed logs in an outdoor or indoor lumber yard to detect and mitigate any pests, bugs, or rodents. The detection and mitigation system monitor sensors can be embedded in, attached to, and/or otherwise coupled to the lumber or logs to provide monitoring during storage, transport, etc. In a second example, the detection and mitigation system can monitor the inside and/or outside of a shipping container with sensors to detect and mitigate any pests, bugs, or rodents. In a third example, the detection and mitigation system monitors vegetation (e.g., trees, plants, etc.) with sensors (e.g., cameras, infrared devices, moisture devices, thermometers, etc.) to detect damage caused by pests, bugs, or rodents. The configuration and functionality of detection and mitigation systems can be selected on the pets to be detected and environment.

In some implementations, the detection and mitigation system can include or communicate with IoT devices to detect any pests, bugs, or rodents in a room. For example, sensors in a room can monitor for any pests, bugs, or rodents and notify a user (e.g., on user interface 705 of FIG. 7) when the pests, bugs, or rodents are detected. Sensors (e.g., cameras, infrared devices, moisture devices, probes, thermometers, etc.) of the detection and mitigation system can send (e.g., via a wireless network NFC, Bluetooth, Z-wave, Zigbee, wired connection, etc.) an alert/notification to a user device regarding a detected event. The user can provide feedback to the system if the detected event was accurate or a false positive and the system can update the machine learning model with the feedback data. The IoT devices can be sensors placed at pest egress locations, pest ingress locations, or other locations determined using machine learning techniques disclosed herein.

Detection and mitigation systems can monitor the pest egress locations and/or pest ingress locations to determine actions (e.g., repositioning of sensors, pest mitigation actions, etc.). The sensors can be coupled to building materials used at the egress locations and/or ingress locations. In some embodiments, the sensors can be coupled to agriculture equipment or installed in green houses, fields, and other agriculture environments to detect/monitor, for example, rodents, worms, bugs, etc. The statistical analyses to data sets can be selected based on the characteristics of the animals to be detected.

Figure 7:
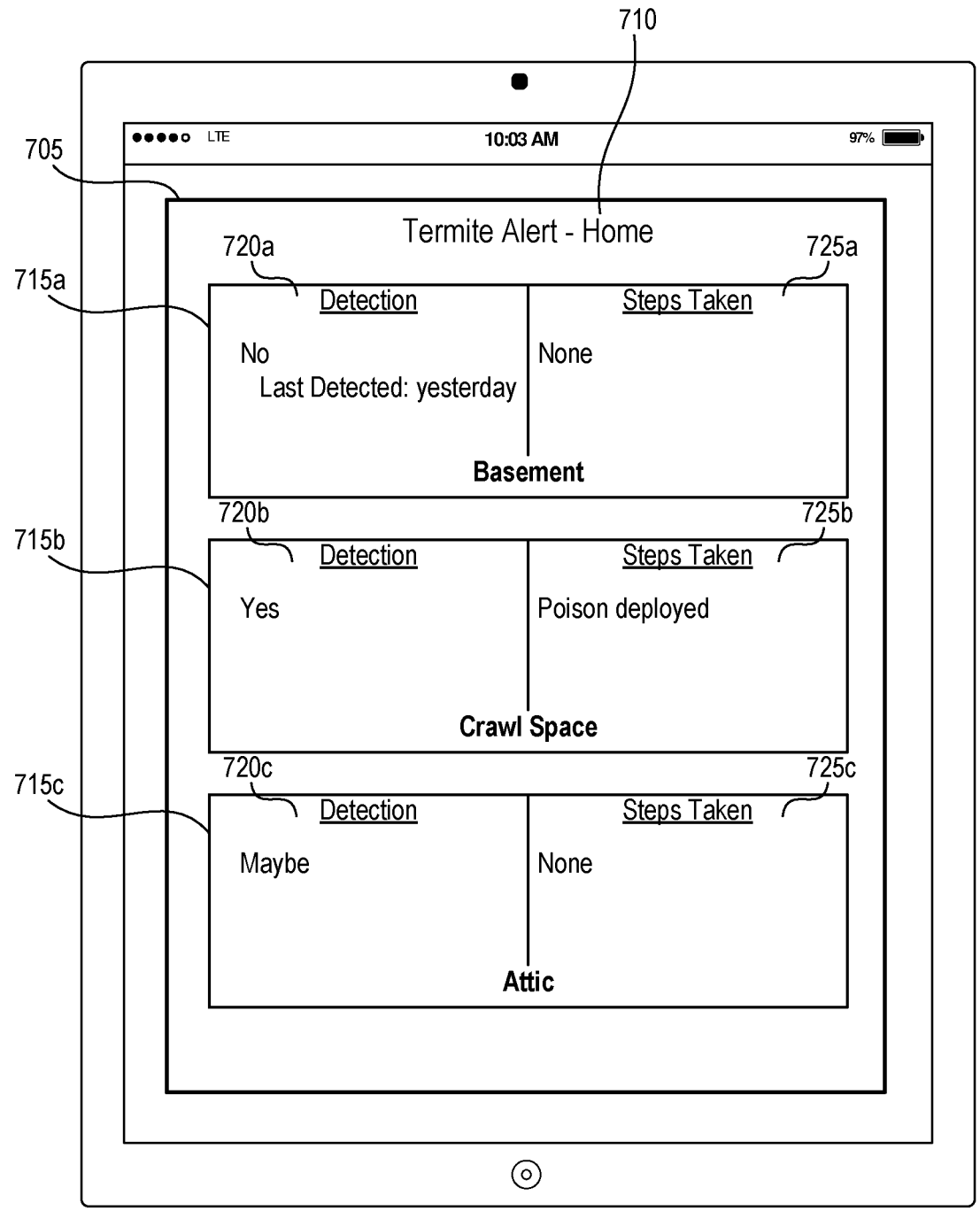
FIG. 7 is a conceptual diagram illustrating an example user interface used in some implementations of a termite detection and mitigation system.

FIG. 7 is a conceptual diagram illustrating an example user interface 705 used in some implementations of a termite detection and mitigation system. The user interface 705 can be used, for example, to report the status or display an alert regarding termite intrusions within a structure 710. The user interface 705 can further provide the status for different areas associated with the structure 710, such as via report areas 715*a*, 715*b*, and 715*c* (corresponding, in the example illustrated in FIG. 7, to a basement, a crawl space, and an attic, respectively). Report areas can include information regarding whether termites have been detected and/or when termites were last detected in the area (e.g., detection statuses 720*a*, 720*b*, and 720*c*). Report areas can further include information regarding what mitigation steps have been taken in the area (e.g., mitigation statuses 725*a*, 725*b*, and 725*c*). For example, in the illustrated example of FIG. 7, the user interface 705 indicates that termites have been detected in the crawl space of a home and poison has been deployed accordingly, but that in the attic of the home, termites were detected with a lesser certainty (indicated by "maybe"), and no mitigation steps were taken.

Several implementations of the disclosed technology are described above in reference to the figures. The computing devices on which the described technology may be implemented can include one or more central processing units, memory devices, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described that may be exhibited by some implementations and not by others. Similarly, various requirements are described that may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of the following: A; B; C; A and B; A and C; B and C; A, B, and C; or multiples of any item, such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

What is claimed is:

1. A method comprising:
   receiving location-related data, wherein the location-related data comprises elevation information, soil type, topographical information, current weather information, seasonal conditions information, or a combination thereof, receiving sensor data, wherein the sensor data comprises sound information, motion information, heat information, moisture information, chemical information, or a combination thereof;

generating a termite detection score model by
generating training items based on the location-related data and the sensor data, each training item including
a collection of words or statistics representing environmental conditions of a respective structure at a geographic area, and
a label specifying a termite detection score for that respective structure;
applying each training item to a neural network model;
comparing output from the neural network model for each structure to the label specifying the termite detection score for that respective structure; and
based on the comparison, applying a loss function to modify aspects of the neural network model;

identifying a structure associated with a user;
generating, based on the termite detection score model, a termite detection score corresponding to the structure;
generating a termite presence alert based on the termite detection score; and
transmitting the termite presence alert to the user.

2. The method of claim 1, wherein generating the termite detection score corresponding to the structure is further based on location-related data and sensor data associated with the structure.

3. The method of claim 2, wherein the sensor data associated with the structure is obtained from a termite sensing device located in the structure.

4. The method of claim 1, further comprising:
determining a mitigation response, wherein the mitigation response comprises one or more of the following: a poison, a sealant, or a combination thereof; and
transmitting a mitigation instruction, based on the determined mitigation response, to a termite sensing device located in the structure.

5. The method of claim 1, wherein the termite detection score model is a statistical model generated by applying a regression analysis on the location-related data and sensor data.

6. The method of claim 1, wherein the termite detection score model is a machine learning model generated by (A) transforming the location-related data and sensor data into one or more statistical models and (B) training the machine learning model based on the location-related data and sensor data.

7. The method of claim 1, wherein the termite detection score characterizes a likelihood of a presence of termites at the corresponding structure.

8. A non-transitory computer-readable storage medium storing instructions that, when executed by a computing system, cause the computing system to perform a process comprising:
receiving location-related data, wherein the location-related data comprises elevation information, soil type, topographical information, current weather information, seasonal conditions information, or a combination thereof,
receiving sensor data, wherein the sensor data comprises sound information, motion information, heat information, moisture information, chemical information, or a combination thereof;
generating a termite detection score model by
generating training items based on the location-related data and the sensor data, each training item including
a collection of words or statistics representing environmental conditions of a respective structure at a geographic area, and
a label specifying a termite detection score for that respective structure;
applying each training item to a neural network model;
comparing output from the neural network model for each structure to the label specifying the termite detection score for that respective structure; and
based on the comparison, applying a loss function to modify aspects of the neural network model;
identifying a structure associated with a user;
generating, based on the termite detection score model, a termite detection score corresponding to the structure;
generating a termite presence alert based on the termite detection score; and
transmitting the termite presence alert to the user.

9. The non-transitory computer-readable storage medium of claim 8, wherein generating the termite detection score corresponding to the structure is further based on location-related data and sensor data associated with the structure.

10. The non-transitory computer-readable storage medium of claim 9, wherein the sensor data associated with the structure is obtained from a termite sensing device located in the structure.

11. The non-transitory computer-readable storage medium of claim 8, wherein the process further comprises:
determining a mitigation response, wherein the mitigation response comprises one or more of the following: a poison, a sealant, or a combination thereof; and
transmitting a mitigation instruction, based on the determined mitigation response, to a termite sensing device located in the structure.

12. The non-transitory computer-readable storage medium of claim 8, wherein the termite detection score model is a statistical model generated by applying a regression analysis on the location-related data and sensor data.

13. The non-transitory computer-readable storage medium of claim 8, wherein the termite detection score model is a machine learning model generated by (A) transforming the location-related data and sensor data into one or more statistical models and (B) training the machine learning model based on the location-related data and sensor data.

14. The non-transitory computer-readable storage medium of claim 8, wherein the termite detection score characterizes a likelihood of a presence of termites at the corresponding structure.

15. A computing system comprising:
one or more processors; and
one or more memories storing instructions that, when executed by the one or more processors, cause the computing system to perform a process comprising:
receiving location-related data, wherein the location-related data comprises elevation information, soil type, topographical information, current weather information, seasonal conditions information, or a combination thereof,
receiving sensor data, wherein the sensor data comprises sound information, motion information, heat information, moisture information, chemical information, or a combination thereof;
generating a termite detection score model by
generating training items based on the location-related data and the sensor data, each training item including a collection of words or statistics representing environmental conditions of a respective structure at a geographic area, and a label specifying a termite detection score for that respective structure;

applying each training item to a neural network model:

comparing output from the neural network model for each structure to the label specifying the termite detection score for that respective structure; and based on the comparison, applying a loss function to modify aspects of the neural network model;

identifying a structure associated with a user;

generating, based on the termite detection score model, a termite detection score corresponding to the structure;

generating a termite presence alert based on the termite detection score; and transmitting the termite presence alert to the user.

16. The computing system of claim 15, wherein the process further comprises: determining a mitigation response, wherein the mitigation response comprises one or more of the following: a poison, a sealant, or a combination thereof, and transmitting a mitigation instruction, based on the determined mitigation response, to a termite sensing device located in the structure.

17. The computing system of claim 15, wherein the termite detection score model is a machine learning model generated by (A) transforming the location-related data and sensor data into one or more statistical models and (B) training the machine learning model based on the location-related data and sensor data.

18. The computing system of claim 15, wherein the termite detection score characterizes a likelihood of a presence of termites at the corresponding structure.

* * * * *